United States Patent
Le-Cam et al.

(10) Patent No.: US 10,480,645 B2
(45) Date of Patent: Nov. 19, 2019

(54) METHOD FOR CONTROLLING AN AUTOMATIC GEARBOX FOR A MOTOR VEHICLE

(71) Applicant: RENAULT s.a.s., Boulogne-Billancourt (FR)

(72) Inventors: Florent Le-Cam, Lardy (FR); Frederic Roudeau, Vitry sur Seine (FR); Aurelien Lefevre, Meudon (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 274 days.

(21) Appl. No.: 15/525,130

(22) PCT Filed: Oct. 20, 2015

(86) PCT No.: PCT/FR2015/052809
§ 371 (c)(1),
(2) Date: May 8, 2017

(87) PCT Pub. No.: WO2016/102789
PCT Pub. Date: Jun. 30, 2016

(65) Prior Publication Data
US 2018/0283536 A1    Oct. 4, 2018

(30) Foreign Application Priority Data

Dec. 22, 2014   (FR) .................................. 14 63090

(51) Int. Cl.
*B60W 30/18*      (2012.01)
*F16H 61/02*      (2006.01)
(Continued)

(52) U.S. Cl.
CPC ... *F16H 61/0213* (2013.01); *B60W 30/18072* (2013.01); *B60W 30/18109* (2013.01);
(Continued)

(58) Field of Classification Search
CPC .................... B60W 2520/105; B60W 2530/16
See application file for complete search history.

(56) References Cited

U.S. PATENT DOCUMENTS 5,201,381 A    4/1993  Neuffer et al.
5,857,161 A    1/1999  Zeilinger et al.
(Continued)

FOREIGN PATENT DOCUMENTS

DE       40 37 248 A1       5/1992
DE       195 24 914 A1      1/1997
WO    WO 2009/109826 A1    9/2009

OTHER PUBLICATIONS

International Search Report dated Jan. 22, 2016, in PCT/FR2015/052809 filed Oct. 20, 2015.
(Continued)

*Primary Examiner* — Tisha D Lewis
(74) *Attorney, Agent, or Firm* — Oblon, McClelland, Maier & Neustadt, L.L.P.

(57) ABSTRACT

A method for controlling an automatic gearbox for a motor vehicle having at least two different drive train states. The method includes: determining minimum deceleration force requirement that needs to be achieved by the drive train state depending on speed of the vehicle, longitudinal acceleration, and resistive forces experienced by the vehicle, then taking a decision to authorize or prohibit the drive train state for which the minimum deceleration force requirement has been calculated depending on the deceleration force setpoint, the current drive chain state, and the minimum force achievable by the drive train state in question.

5 Claims, 3 Drawing Sheets

(51) Int. Cl.
   *F16H 59/22*     (2006.01)
   *F16H 59/44*     (2006.01)
   *F16H 59/48*     (2006.01)
   *F16H 59/54*     (2006.01)
   *F16H 59/66*     (2006.01)

(52) U.S. Cl.
   CPC ... *B60W 2520/10* (2013.01); *B60W 2520/105* (2013.01); *B60W 2530/16* (2013.01); *F16H 59/22* (2013.01); *F16H 59/44* (2013.01); *F16H 59/48* (2013.01); *F16H 59/54* (2013.01); *F16H 59/66* (2013.01); *F16H 2059/663* (2013.01); *F16H 2061/0227* (2013.01); *F16H 2061/0237* (2013.01)

(56) References Cited

U.S. PATENT DOCUMENTS

| | | | |
|---|---|---|---|
| 9,630,623 B2* | 4/2017 | Fairgrieve | B60L 3/106 |
| 2011/0165992 A1 | 7/2011 | Ueno et al. | |
| 2015/0353089 A1* | 12/2015 | Yoshino | B60W 10/04 701/54 |
| 2017/0282898 A1* | 10/2017 | Shimizu | B60L 58/12 |

OTHER PUBLICATIONS

French Search Report dated Aug. 6, 2015, in French Application 1463090 filed Dec. 22, 2014.

* cited by examiner

METHOD FOR CONTROLLING AN AUTOMATIC GEARBOX FOR A MOTOR VEHICLE

BACKGROUND

The technical field of the invention is that of the control of gearboxes for motor vehicles and more particularly that of the control of automatic gearboxes.

Controlling hybrid powertrains generally includes a function generating a drivetrain state target.

This function enables determination of a drivetrain state target optimizing the operating point of a hybrid powertrain.

It has to be remembered that a drivetrain state is defined by a combination of coupler state(s) and reducer state(s) specific to a given vehicle architecture.

For a gearbox of a vehicle with an internal combustion engine, one example of a drivetrain state is an engaged first reducer state and an engaged state of the clutch between the internal combustion engine and the gearbox. For a gearbox of a hybrid vehicle, one example of a drivetrain state is a disengaged state of the clutch between the internal combustion engine and the gearbox connected to the front wheels with electric motors propelling the vehicle via the rear wheels.

The inventors have based the design of the function generating a drivetrain state target on strategies for optimizing the operating point of a powertrain dedicated to vehicles with an internal combustion engine and enabling optimum management of the compromise between expected services such as acoustic factors, harshness, consumption and pollution reduction requirements.

The inventors went on to verify whether, if used in series, the current strategies could address the same requirement for hybrid powertrains. A preliminary study was therefore carried out to see if it was possible to make direct use of the strategies developed for powertrains dedicated to vehicles with an internal combustion engine to choose the most appropriate gearbox ratio or drivetrain state.

In the case of a hybrid powertrain, the significant differences as seen from the transmission side are as follows:

the internal combustion engine is no longer the only source of motive power, for the same power requirement, there exist a multitude of possible combinations of the power delivered by the internal combustion engine and that delivered by the electric motor(s), depending on the envisaged technical definition, the power of the electrical machine either passes through the transmission or does not, the maximum and minimum static and dynamic limits of the hybrid powertrain can depend on the state of charge of the battery and can therefore vary as a function of time, the electrical or ZEV (Zero Emission Vehicle) mode combines one or more specific possible drivetrain states by the same token as the discrete ratios.

Thus analysis of the four services that these strategies have to provide in the case of a hybrid powertrain leads to the following conclusions:

The acoustic factors for the same operating point (speed, motive power) depend on the relative distribution of electrical power and thermal power. In other words, if only the electric motor is operating, the powertrain makes less noise than if the internal combustion engine and the electric motor are both operating. Compared to the electric motor, the internal combustion engine is the only source of noise.

Harshness, i.e. the performance of the powertrain, can depend on the state of charge of the battery.

Accordingly, when the battery is charged it is possible to use simultaneously the power delivered by the electric motor and by the internal combustion engine. On the other hand, if the battery is discharged the only available source of motive power is the internal combustion engine, which leads to a possible reduction of performance.

A new parameter has to be taken into account for the consumption and pollution reduction requirements. This refers to the energy management law the object of which is, in each of the possible powertrain states, to determine the relative distribution of the power delivered by the internal combustion engine and by the electric motor as a function of the state of charge of the battery.

The use of a hybrid powertrain therefore makes it necessary for the current strategies to evolve. The state of charge of the battery is an important new factor to be taken into account in generating the ratio target for a hybrid transmission.

Taking this factor into account makes it possible to optimize consumption and pollution reduction. In fact, the adoption of an electric powertrain was mainly motivated by reducing consumption, so taking same into account cannot be bypassed. It is therefore necessary for the strategies for generation of the drivetrain state target to interact with the energy management law.

Taking the battery charge state into account also makes it possible to optimize harshness. The variation of the harshness constraints as a function of the state of charge of the battery depends on the required performance of the powertrain. In fact, the maximum power of the powertrain depends on the power of the internal combustion engine or electric motor(s) present and available.

Taking the battery charge state into account finally makes it possible to optimize the acoustic factors. The impact on the acoustic factors of taking this state into account is less critical than the impact on consumption. By default, the engine speed targets could be calibrated for 100% internal combustion engine use. The resulting under-optimized zones would likely be minimal.

To summarize, the hybrid technology necessitates complete revision of the current strategies for controlling the optimization of the operating point of the powertrain (chosen gearbox ratio) that are generally oriented only toward application to the control of a vehicle with only an internal combustion engine. These strategies do not take into account the specific factors linked to the hybrid technology and notably the times and the conditions that govern changing from one drivetrain state to another.

There is therefore a requirement at this level.

The aim is for a motor vehicle equipped with an automatic gearbox to be in an optimum drivetrain state under all possible rolling conditions. Many constraints of NVH (Noise, Vibration, Harshness), reliability, mechanical ratio, brio (acceleration in reserve, driver demand, etc.) and other types make it possible to guarantee correct and appropriate behavior of the vehicle under the conditions applying when the driver seeks to maintain a stable speed or to accelerate.

When the driver's aim is to decelerate, the recommended drivetrain state is then a function of those same constraints, which in no way reflect the deceleration dynamic that the vehicle must exhibit. The drivetrain state will therefore potentially be irrelevant and could imply a "natural" level of deceleration (resisting force and engine braking) inappropriate to the road in use and its slope or the dynamic required by the driver via low or strong braking.

A concrete example of this problematic may be described with the aid of a vehicle with an internal combustion engine on a downgrade with a high coefficient. The vehicle and more particularly the strategies for choosing the optimum drivetrain state can tend toward the choice of a "long" ratio by complying with all NVH, brio (little acceleration in reserve), etc. constraints and being considered from the energy point of view as better than "short" drivetrain states. In this precise situation the vehicle can then become extremely skittish and may even accelerate, obliging the driver to brake strongly in order to decelerate or even to maintain the speed or even to downshift manually, obliging the driver to switch to manual transmission.

The technical problem to be solved is therefore as follows:

How to guarantee a certain level of deceleration of the vehicle by choosing the optimum drivetrain state?

The prior art includes the following documents.

FR2765652 describes applications to an automatic gearbox for non-hybrid vehicles in which it is possible to change only one ratio at a time with a braking assistance function conditional on depression of the brake pedal.

FR2875204 describes non-hybrid automatic gearbox applications with the braking assistance function conditional on depression of the brake pedal with control by increasing the static engine torque target.

FR2877416 describes non-hybrid automatic gearbox applications with the braking assistance function conditional on depression of the brake pedal with control by estimation of a primary rotation speed target.

US 20080046157 describes a strategy that functions only with determination of transmission ratios from speed thresholds that is valid only for vehicles where it is possible to change only one ratio at a time and that does not take into account differential forces that can arise from a headwind or a slope. The parameters making it possible to define a downshift are expressed as a speed offset relative to the existing lines and therefore with no concept of acceleration.

US 20140066251 describes a strategy that is valid only for vehicles where only one ratio can be changed at a time, which does not guarantee a given deceleration as it merely prohibits upshifts according to the given deceleration level of the vehicle (inhibition of all upshifts from a ratio N+2 or N+3) and does not take into account the differential forces that can arise from a headwind, a slope, etc.

BRIEF SUMMARY

The invention consists in a method for controlling an automatic gearbox for a motor vehicle having at least two different drivetrain states. The method comprises the following steps:

determining the minimum deceleration force constraint that needs to be produced by the drivetrain state as a function of the speed of the vehicle, the longitudinal acceleration and the resistive forces on the vehicle, then taking a decision in order to authorize or prohibit the drivetrain state for which the minimum deceleration force constraint has been calculated as a function of the deceleration force target, the current drivetrain state and the minimum force that can be produced by the drivetrain state in question.

To determine the minimum deceleration force constraint that the drivetrain state must produce, the following steps may be executed:

determining the required deceleration of the vehicle with the foot off the accelerator by means of a first map as a function of the type program of the vehicle and its current speed, then determining a differential force as the difference between the theoretical resisting force on a road of zero slope, with predefined mass and without wind, and the instantaneously estimated resisting force taking account of current rolling conditions, then determining an offset corrective parameter by means of a second map as a function of the differential force, then determining a required deceleration of the vehicle taking into account the differential forces resulting from the sum of the required deceleration of the vehicle with the foot off the accelerator and the offset corrective parameter, then determining the overall deceleration force as a function of the required deceleration and the mass of the vehicle, then determining the force that the drivetrain state must produce as the sum of the resisting forces and the overall deceleration force, then summing a force offset value and the deceleration constraint in order to determine the deceleration force with the foot off the accelerator with or without braking that a drivetrain state must comply with, then determining which is the greater of the deceleration force with the foot off the accelerator with or without braking and the force target at the level of the wheels required by the driver, then saturating the maximum value determined in this way so that it is negative or zero, the saturated value corresponding to the minimum deceleration force constraint that the drivetrain state must achieve.

It may be determined if the drivetrain state for which the minimum deceleration force constraint is determined is the current state; if so, a first alternative map can be used that is less constraining than the first map used if the drivetrain state for which the minimum deceleration force constraint is determined is not the current state.

To determine a force offset value, the following steps may be executed:

determining if the depression of the brake pedal is maintained for a minimum duration and if the longitudinal acceleration of the vehicle is less than 0; if so, the vehicle acceleration during braking is made equal to the longitudinal acceleration value; if not, the vehicle acceleration during braking is set at 0, determining the acceleration offset value by means of maps as a function of the vehicle acceleration during braking and the vehicle speed, the map used depending on the vehicle type program, multiplying the acceleration offset value by the vehicle mass in order to obtain the force offset value.

To determine whether to authorize or to prohibit a drivetrain state the following steps may be executed:

authorizing the drivetrain state if, simultaneously, the drivetrain state is the current state and if the minimum force available therein is less than or equal to the deceleration force target determined for the current state, also authorizing the drivetrain state if, simultaneously, the drivetrain state is not the current state and the minimum force available therein is less than or equal to the deceleration force target determined for the non-current states, otherwise prohibiting the drivetrain state.

The above method has several advantages, among which may be cited easy implementation, a real time character making it possible to take into account changing vehicle parameters (minimum forces in transition states, external forces, brake depression, etc.) and coverage of all hybrid powertrain architectures, including purely internal combustion engine and purely electrical architectures, having a transmission with at least two distinct drivetrain states.

BRIEF DESCRIPTION OF THE DRAWINGS

Other objects, features and advantages of the invention will become apparent on reading the following description given by way of nonlimiting example only and with reference to the appended drawings, in which.

DETAILED DESCRIPTION

The aim of the control method that has been developed is to prohibit drivetrain states that do not satisfy a deceleration constraint generated as a function of the rolling conditions.

This method can be used for all internal combustion engine, hybrid and electric vehicles equipped with an automatic transmission, whether or not involving partial or total interruption of the traction torque and having at least two distinct drivetrain states.

Its operating principle consists in computing a force constraint that a drivetrain state has to produce in order to produce a given deceleration.

A number of physical parameters linked to the vehicle therefore come to be taken into account in that computation:
estimation of the resisting forces (slope, wind, etc.),
real or virtual driver force or torque target at the wheel (RV/LV ADAS, ACC, etc.),
longitudinal acceleration of the vehicle,
vehicle speed,
mass of the vehicle,
minimum possible forces in the drivetrain states.

Figure 1:
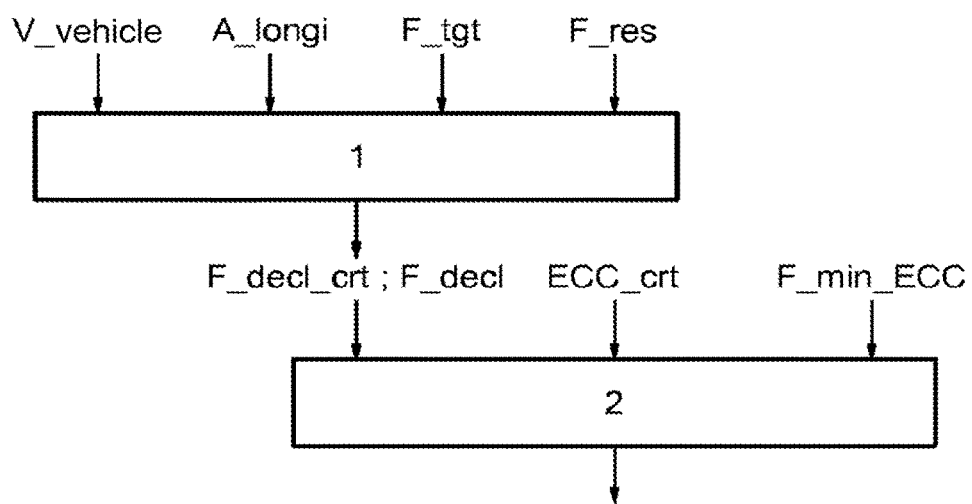
FIG. 1 illustrates the principal steps of a method according to the invention of controlling an automatic gearbox.
Figure 2:
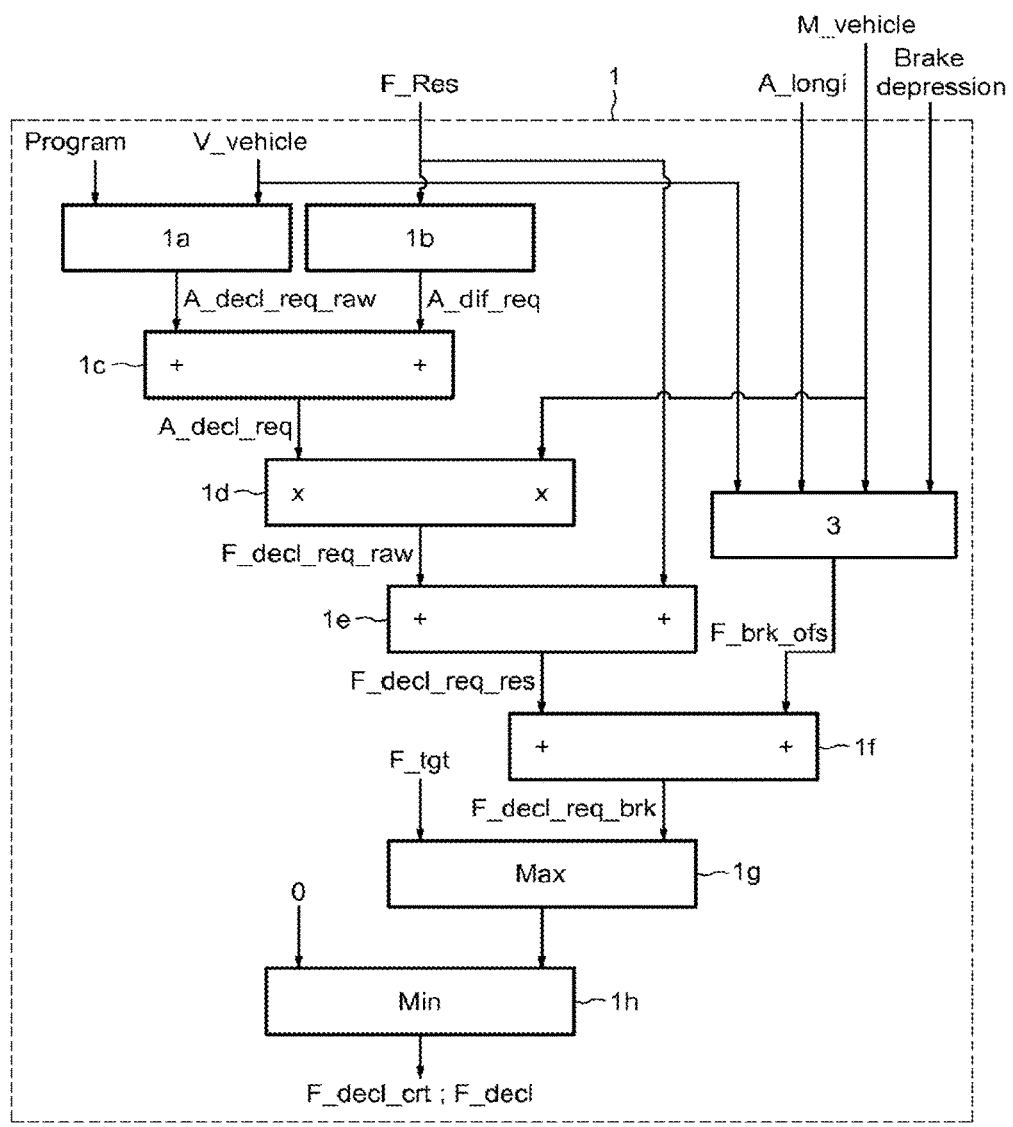
FIG. 2 illustrates the principal sub-steps of the first step of the control method.
Figure 3:
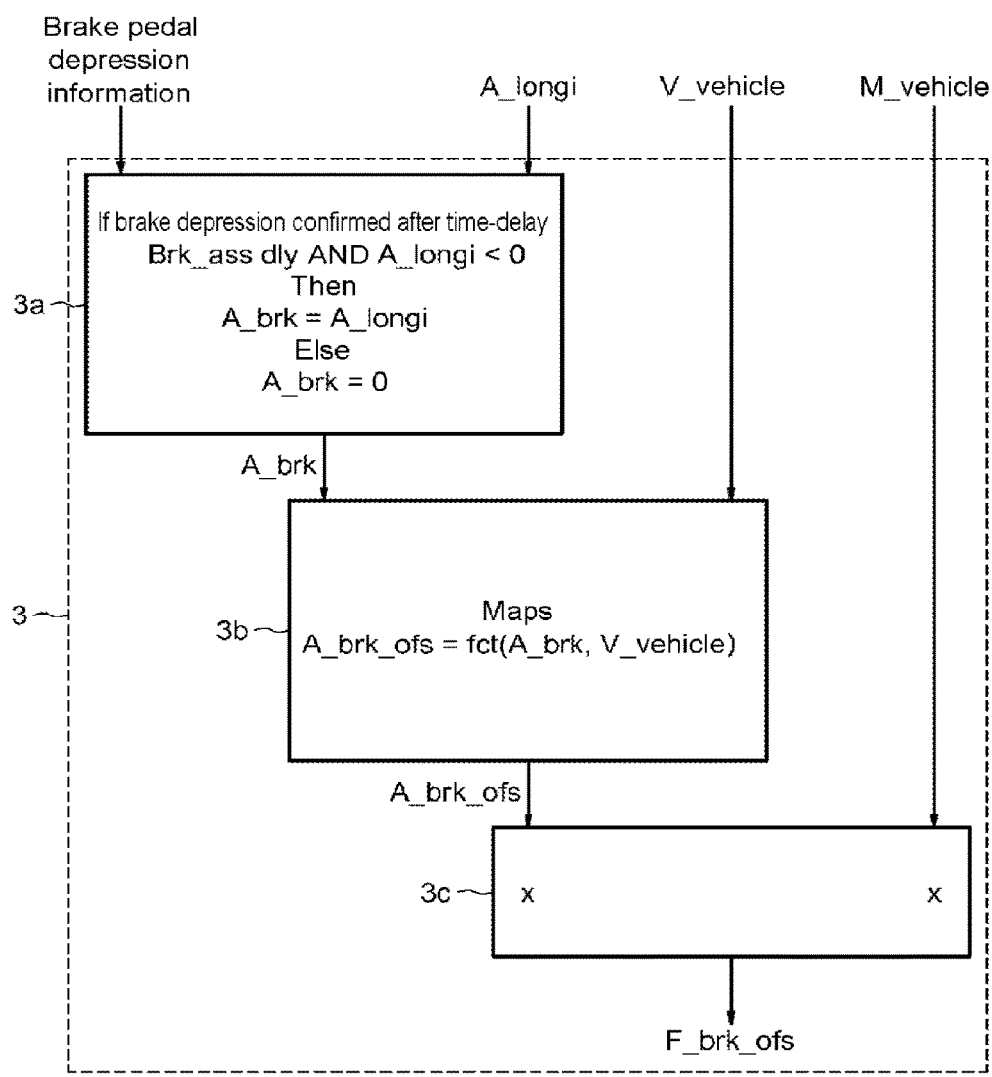
FIG. 3 illustrates other sub-steps of the first step of the control method.

The principal steps and sub-steps of the control method illustrated by FIGS. 1, 2 and 3 are as follows.

The control method comprises a plurality of steps leading to the prohibition or authorization of a drivetrain state (ECC) as a function of the comparison of a constraint linked to the deceleration situation with the deceleration capability of the current or envisaged drivetrain state.

The mechanism described hereinafter for a target state is implemented identically for all potential target drivetrain states of the powertrain.

In FIG. 1 can be seen the two principal steps of the control method. During a first step 1 there is determined the minimum deceleration force constraint that must be produced by the drivetrain state F_decl_crt and F_decl according to whether the drivetrain state is identical to the current mode or not. During a second step 2, a decision is taken enabling authorization or prohibition of the drivetrain state for which the minimum deceleration force constraint has been calculated.

The first step 1 will now be described and is illustrated by FIG. 2.

During a first sub-step 1a, the required deceleration A_decl_req_raw of the vehicle with the foot off the accelerator is determined by means of a map A_req that is a function of the vehicle type program (Eco, Normal, Sport, etc.) and its current speed V_vehicle. The required deceleration A_decl_req_raw of the vehicle with the foot off the accelerator is a negative acceleration.

During a second sub-step 1b a differential force F_dif is determined as the difference between the theoretical resisting force on a road of zero slope, with a predefined mass and with no wind and the instantaneously estimated resisting force therefore representing the additional resisting force caused by the current rolling conditions, after which an offset corrective parameter A_dif_req is determined by means of a second map as a function of the differential force F_dif.

This offset corrective parameter A_dif_req has the function of limiting the impact of the additional resisting forces on the final computation of the deceleration constraints.

During a third sub-step 1c a required vehicle deceleration is determined taking into account the differential forces A_decl_req obtained from the sum of the required deceleration A_decl_req_raw of the vehicle with the foot off the accelerator and the offset corrective parameter A_dif_req.

Thus at equal vehicle speeds the required deceleration A_decl_req could be different depending on the slope of the road taken that for the most part F_dif represents.

During a fourth sub-step 1d the overall deceleration force F_decl_req_raw is determined as a function of the required deceleration A_decl_req and the vehicle mass M_vehicle.

That overall deceleration force F_decl_req_raw is the force necessary to produce the required deceleration and includes both the resisting forces and the force supplied by the powertrain via the drivetrain state.

During a fifth step 1e the force F_decl_req_res that a drivetrain state must provide is determined as the sum of the resisting forces F_res and the overall deceleration force F_decl_req_raw.

The resisting forces F_res correspond to the forces braking forward and reverse movement of the vehicle computed from the vehicle dynamic (longitudinal acceleration), the theoretical mass of the vehicle and the traction force at the wheel produced by the powertrain.

It is moreover important to take account of the vehicle dynamic required by the driver. The engine braking and therefore the level of deceleration that a drivetrain state must produce is not the same in the case of simply lifting the foot off the accelerator (accelerator pedal at rest) and in the case of braking, whether low or stronger. Sub-step 3 enables this dynamic aspect to be taken into account by computing a force offset value F_brk_ofs. For clarity, this sub-step 3 will be described hereinafter with reference to FIG. 3.

During a sub-step 1f, the force offset value F_brk_ofs and the deceleration constraint F_decl_req_res are added together in order to determine the deceleration force F_decl_req_brk with the foot off the accelerator with or without braking that a drivetrain state must comply with.

During a sub-step 1g which is the greater of the deceleration force F_decl_req_brk with the foot off the accelerator with or without braking and the force target F_tgt at the wheels required by the actual driver is determined from the accelerator pedal position or virtual requests (RV/LV ADAS, ACC, etc.).

Then, during a sub-step 1h, the maximum value determined in this way is saturated to render it negative or zero. The saturated value corresponds to the final deceleration constraint F_decl.

Sub-steps 1g and 1h may be determined simultaneously by application of the following formula:

$$F\_decl = \text{Min}(\text{Max}(F\_tgt; F\_decl\_req\_brk); 0) \quad \text{(Eq. 1)}$$

This computation of F_decl is valid for all drivetrain states apart from the current drivetrain state.

In the case of a current drivetrain state, a second deceleration constraint F_decl_crt is computed in exactly the same way as F_decl except that the required raw deceleration map A_req differs by being less constraining compared to the other drivetrain states. This distinction between the current or non-current drivetrain state is therefore made in order to prevent any risk of authorization/prohibition hunting of a drivetrain state and operates like a hysteresis mechanism.

The sub-step 3 referred to above will now be described with reference to FIG. 3.

There is first determined the value assumed by the vehicle acceleration A_brk during braking according to the rolling conditions. To be more precise, during a first sub-step 3a it is determined if depression of the brake pedal continues for a minimum duration Brk_ass_dly and if the longitudinal acceleration A_longi of the vehicle is below 0.

If so, the vehicle acceleration A_brk during braking is set equal to the longitudinal acceleration value A_longi. The method continues with the computation of an acceleration offset value A_brk_ofs in the step 3b.

If not, the vehicle acceleration A_brk during braking is set at 0. The method also continues with the computation of an acceleration offset value A_brk_ofs in the step 3b. However, the offset values computed are zero because of the zero value of the vehicle acceleration during braking. These offset values therefore have no impact on the deceleration constraints.

During a sub-step 3b, the acceleration offset value A_brk_ofs is determined by means of maps as a function of the vehicle acceleration A_brk during braking and the vehicle speed V_vehicle. The choice of the map used depends on the vehicle type program, thus making it possible to adapt the level of deceleration supplied directly by the powertrain and therefore by the drivetrain state to the use of the vehicle by supplying a large proportion of the deceleration in a Sport program partly relieving the brakes or a low proportion in an Eco program in which the brakes are loaded less.

The acceleration offset value A_brk_ofs obtained then corresponds to the surplus deceleration required from the powertrain to assist the deceleration of the vehicle.

During a sub-step 3c the acceleration offset value A_brk_ofs is multiplied by the vehicle mass M_vehicle in order to obtain the additional force that a drivetrain state must provide to facilitate the deceleration of the vehicle during more or less strong braking. This additional force corresponds to the force offset value F_brk_ofs.

The second step 2 will now be described with reference to FIG. 1. During the second step 2 whether to authorize or to prohibit a drivetrain state is determined as a function of the deceleration force targets (F_decl; F_decl_crt), the current state ECC_crt of the drivetrain and the minimum force F_min_ECC that can be produced by the drivetrain state in question.

The drivetrain state is authorized if:
The state in question is the current state ECC_crt and the minimum force Fmin_ECC available in that state is less than or equal to the deceleration force target F_decl_crt for the current state.
The state in question is not the current state ECC_crt and the minimum force Fmin_ECC available in that state is less than or equal to the deceleration force target F_decl for the non-current states.

Otherwise the result of the decision step 2 is a prohibited drivetrain state because it does not satisfy the deceleration constraints that have been generated.

The invention claimed is:

1. A method for controlling an automatic gearbox for a motor vehicle having at least two different drivetrain states, the method comprising:
   determining a minimum deceleration force constraint that needs to be produced by the drivetrain state as a function of speed of the vehicle, longitudinal acceleration, and resistive forces on the vehicle;
   then taking a decision to authorize or prohibit the drivetrain state for which the minimum deceleration force constraint has been calculated as a function of a deceleration force target, a current drivetrain state, and a minimum force that can be produced by the drivetrain state in question.

2. The method as claimed in claim 1, wherein the determining the minimum deceleration force constraint that the drivetrain state must produce comprises:
   determining required deceleration of the vehicle with a foot off an accelerator of the vehicle by a first map as a function of a program of the vehicle and a current speed of the vehicle;
   then determining a differential force as a difference between theoretical resisting force on a road of zero slope, with predefined mass and without wind, and instantaneously estimated resisting force taking account of current rolling conditions;
   then determining an offset corrective parameter by a second map as a function of the differential force;
   then determining a required deceleration of the vehicle taking into account the differential forces resulting from a sum of the required deceleration of the vehicle with the foot off the accelerator and the offset corrective parameter;
   then determining overall deceleration force as a function of the required deceleration and mass of the vehicle;
   then determining the force that the drivetrain state must produce as a sum of the resisting forces and the overall deceleration force;
   then summing a force offset value and the deceleration constraint to determine the deceleration force with the foot off the accelerator with or without braking that a drivetrain state must comply with;
   then determining which is greater of the deceleration force with the foot off the accelerator with or without braking and the force target at a level of wheels of the vehicle required by the driver;
   then saturating a maximum value determined so that it is negative or zero, the saturated value corresponding to the minimum deceleration force constraint that the drivetrain state in question must achieve.

3. The method as claimed in claim 2, further comprising determining if the drivetrain state for which the minimum deceleration force constraint is determined is the current state,
   if so, a first alternative map is used that is less constraining than the first map used if the drivetrain state for which the minimum deceleration force constraint is determined is not the current state.

4. The method as claimed in claim 2, wherein, to determine a force offset value, further comprising:
   determining if depression of a brake pedal of the vehicle is maintained for a minimum duration and if the longitudinal acceleration of the vehicle is less than 0;

if so, the vehicle acceleration during braking is made equal to the longitudinal acceleration value, if not, the vehicle acceleration during braking is set at 0;

determining an acceleration offset value by maps as a function of the vehicle acceleration during braking and the vehicle speed, the map used depending on the program of the vehicle;

multiplying the acceleration offset value by the vehicle mass in order to obtain the force offset value.

5. The method as claimed in claim 1, wherein, to determine whether to authorize or to prohibit a drivetrain state, further comprising:

authorizing the drivetrain state if, simultaneously, the drivetrain state is the current state and the minimum force available therein is less than or equal to the deceleration force target determined for the current state;

also authorizing the drivetrain state if, simultaneously, the drivetrain state is not the current state and the minimum force available therein is less than or equal to the deceleration force target determined for the drivetrain states that are not the current state;

otherwise prohibiting the drivetrain state.

* * * * *